United States Patent
Li et al.

(10) Patent No.: US 10,096,291 B2
(45) Date of Patent: Oct. 9, 2018

(54) DRIVE STRUCTURE OF A LIQUID CRYSTAL DISPLAY PANEL TO ACHIEVE VOLTAGE CHARGING AND VOLTAGE SHARING UNDER A 2D AND 3D DISPLAY MODE

(71) Applicant: Shenzhen China Star Optoelectronics Technology Co., Ltd., Shenzhen, Guangdong (CN)

(72) Inventors: Meng Li, Guangdong (CN); Jinjie Wang, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 14/417,635

(22) PCT Filed: Jan. 16, 2015

(86) PCT No.: PCT/CN2015/070932
§ 371 (c)(1),
(2) Date: May 4, 2016

(87) PCT Pub. No.: WO2016/061916
PCT Pub. Date: Apr. 28, 2016

(65) Prior Publication Data
US 2016/0247468 A1 Aug. 25, 2016

(30) Foreign Application Priority Data
Oct. 24, 2014 (CN) .......................... 2014 1 0573079

(51) Int. Cl.
*G09G 3/36* (2006.01)
*G09G 3/00* (2006.01)
*H04N 13/04* (2006.01)

(52) U.S. Cl.
CPC .......... *G09G 3/3614* (2013.01); *G09G 3/003* (2013.01); *G09G 3/3677* (2013.01);
(Continued)

(58) Field of Classification Search
CPC .... G09G 3/003; G09G 3/3614; G09G 3/3677; G09G 3/3696; G09G 3/3648;
(Continued)

(56) References Cited

U.S. PATENT DOCUMENTS

| 8,830,154 | B2 * | 9/2014 | Wang | G09G 3/3677 |
|  |  |  |  | 345/100 |
| 9,311,838 | B2 * | 4/2016 | Li | H04N 13/0033 |

(Continued)

FOREIGN PATENT DOCUMENTS

| CN | 103728751 A | 4/2014 |
| CN | 103728752 A | 4/2014 |
| JP | 3537078 B2 | 6/2004 |

OTHER PUBLICATIONS

Chinese Office Action and Search Report, dated Mar. 24, 2016.

*Primary Examiner* — Alexander Eisen
*Assistant Examiner* — Nelson Lam
(74) *Attorney, Agent, or Firm* — Kim Winston LLP

(57) ABSTRACT

Disclosed are a liquid crystal display panel, and a drive structure and a drive method thereof. The drive structure comprises a plurality of gate lines, a plurality of sets of charge and share gate lines, a plurality of switch units, a first drive signal line, a second drive signal line, a third drive signal line, a fourth drive signal line, and a low-voltage signal line. A plurality of switch units is used in conjunction with corresponding timing signals to achieve separate control of the functions of voltage charging and voltage sharing.

1 Claim, 2 Drawing Sheets

(52) U.S. Cl.
CPC ..... *H04N 13/0454* (2013.01); *H04N 13/0497* (2013.01); *G09G 2310/0251* (2013.01); *G09G 2310/08* (2013.01); *G09G 2320/0204* (2013.01); *G09G 2320/0247* (2013.01)

(58) Field of Classification Search
CPC .. G09G 3/3659; G09G 3/3674; G09G 3/3681; G09G 3/3685; G09G 3/3688; G09G 3/3692
USPC .................................................... 345/87–104
See application file for complete search history.

(56) References Cited

U.S. PATENT DOCUMENTS

| | | | | |
|---|---|---|---|---|
| 9,368,076 | B2* | 6/2016 | Li | G09G 3/003 |
| 2013/0100108 | A1* | 4/2013 | Chiang | G09G 3/3659 |
| | | | | 345/212 |
| 2013/0127796 | A1* | 5/2013 | Li | G09G 5/00 |
| | | | | 345/204 |
| 2013/0215089 | A1* | 8/2013 | Wang | G09G 3/3677 |
| | | | | 345/92 |
| 2013/0257837 | A1* | 10/2013 | Wang | G09G 3/3696 |
| | | | | 345/211 |
| 2013/0271357 | A1* | 10/2013 | Wang | G09G 3/3677 |
| | | | | 345/92 |
| 2013/0300730 | A1* | 11/2013 | Chen | H04N 13/0434 |
| | | | | 345/419 |
| 2014/0104148 | A1* | 4/2014 | Wang | G09G 5/00 |
| | | | | 345/92 |
| 2015/0103063 | A1* | 4/2015 | Ye | G09G 3/3648 |
| | | | | 345/212 |
| 2015/0154723 | A1* | 6/2015 | Wu | G06T 1/00 |
| | | | | 345/522 |
| 2015/0194103 | A1* | 7/2015 | Li | H04N 13/0033 |
| | | | | 345/691 |
| 2015/0294632 | A1* | 10/2015 | Chen | G02F 1/134336 |
| | | | | 345/215 |
| 2015/0325182 | A1* | 11/2015 | Li | G09G 3/003 |
| | | | | 345/89 |
| 2016/0247426 | A1* | 8/2016 | Huang | G02F 1/134309 |
| 2016/0247467 | A1* | 8/2016 | Wang | H04N 13/00 |
| 2017/0154593 | A1* | 6/2017 | Wang | G09G 3/3677 |

* cited by examiner

DRIVE STRUCTURE OF A LIQUID CRYSTAL DISPLAY PANEL TO ACHIEVE VOLTAGE CHARGING AND VOLTAGE SHARING UNDER A 2D AND 3D DISPLAY MODE

CROSS-REFERENCE TO RELATED APPLICATIONS

The present application claims benefit of Chinese patent application CN 201410573079.7, entitled "Liquid crystal display panel, and drive structure and drive method thereof" and filed on Oct. 24, 2014, the entirety of which is incorporated herein by reference.

FIELD OF THE INVENTION

The present disclosure relates to a liquid crystal display, and in particular, to a liquid crystal display panel, and a drive structure and a drive method thereof.

BACKGROUND OF THE INVENTION

Recent years, in a thinning display trend, has witnessed wide use of liquid crystal displays (LCDs for short) in various electronic products, such as mobile phones, laptops, and color televisions.

A charge sharing design is typically used in order to eliminate the problem of color shift in an LCD panel. However, in a product having both 2D and 3D display modes, the charge sharing function would become invalid under the 3D display mode due to a frame inversion driving manner. This would lead to a flicker phenomenon during display of 3D pictures.

More specifically, a grayscale picture under the 3D display mode is actually generated when white and black picture frames are blended. Under the 3D display mode of an LCD panel, a first picture frame is white, while a second picture frame is black. And white picture frames and black picture frames are thus presented in turn. A white picture frame is to be overlapped with a black picture frame to form a grayscale picture seen by the human eyes. Under a frame inversion driving mode, for instance, polarity inversion is performed once in each picture frame. As FIG. 1 indicates, with respect to a reference voltage Vcom, a white picture frame is of a positive polarity one involving a large voltage variation, while a black picture frame is of a negative polarity one involving a small voltage variation. If such picture frames are shown for a long term, the liquid crystals would be subject to influences of polarization, thus leading to the phenomenon of image persistence.

In order to eliminate the phenomenon of image persistence, the inversion manner of frames is generally altered from inversion at every frame to inversion at every two frames, which, however, would cause a difference in brightness between the left eye and the right eye, due to a relatively high charge saturation of a second picture frame in two consecutive frames of the same polarity. Consequently, the flicker phenomenon is still hart to be overcome.

In order to effectively eliminate the flicker phenomenon, the functions of voltage charging and voltage sharing are separately controlled in the prior art. Under such a circumstance, each gate driver output merely corresponds to one charge gate line or one share gate line. This, however, would lead to the problem of doubled gate IC channels, so that doubled ICs have to be used, thereby increasing production costs.

Therefore, it is one of the commitments in the field to eliminate the flicker phenomenon of a picture in an LCD panel under the 3D display mode without increased production costs.

SUMMARY OF THE INVENTION

One of the problems to be solved by the present disclosure is to provide a drive structure of a liquid crystal display panel. Through such a structure, the flicker phenomenon of a picture under a 3D display mode can be effectively eliminated without additional costs. The present disclosure further provides a liquid crystal display panel, and a drive method thereof.

1) In order to solve the above technical problem, the present disclosure provides a drive structure of a liquid crystal display panel, comprising: a plurality of gate lines; a plurality of sets of charge and share gate line, each set of charge and share gate lines corresponding to one of said plurality of gate lines and comprising a charge gate line and a share gate line; a plurality of switch units arranged at a gate driver input terminal; a plurality of switch units arranged at a gate driver output terminal, each corresponding to one of said the plurality of switch units arranged at the gate driver input terminal; a first drive signal line and a second drive signal line that are both arranged at the gate driver input terminal; and a third drive signal line, a fourth drive signal line, and a low-voltage signal line that are all arranged at the gate driver output terminal, wherein each set of charge and share gate lines can be controlled by a corresponding switch unit arranged at the gate driver input terminal based on signals of the first drive signal line and the second drive signal line, and meanwhile by a corresponding switch unit arranged at the gate driver output terminal based on signals of the third drive signal line, the fourth drive signal line, and the low-voltage signal line, to achieve voltage charging and voltage sharing under a 2D display mode, and voltage charging under a 3D display mode.

2) In one preferred embodiment according to item 1) of the present disclosure, each switch unit arranged at the gate driver input terminal comprises a first switch element for controlling the charge gate line of a set of charge and share gate lines, and a second switch element for controlling the share gate line of said set of charge and share gate lines, each of the switch elements having a gate, a first source/drain, and a second source/drain. The first switch element in each switch unit has its gate electrically connected to the first drive signal line, its first source/drain electrically connected to the charge gate line of a set of charge and share gate lines, and its second source/drain, together with the first source/drain of the second switch element, electrically connected to the gate line corresponding to said set of charge and share gate lines, while the second switch element has its gate electrically connected to the second drive signal line, and its second source/drain electrically connected to the share gate line of said set of charge and share gate lines.

3) In one preferred embodiment according to item 1) or 2) of the present disclosure, each switch unit arranged at the gate driver output terminal comprises a third switch element for controlling the charge gate line of a set of charge and share gate lines, and a fourth switch element for controlling the share gate line of said set of charge and share gate lines, each of the switch elements having a gate, a first source/drain, and a second source/drain. The third switch element in each switch unit has its gate electrically connected to the third drive signal line, its first source/drain electrically connected to the charge gate line of a set of charge and share gate lines, and its second source/drain, together with the first source/drain of the fourth switch element, electrically connected to the low-voltage signal line, while the fourth switch element has its gate electrically connected to the fourth drive signal line, and its second source/drain electrically connected to the share gate line of said set of charge and share gate lines.

4) According to another aspect of the present disclosure, a liquid crystal display panel is further provided, comprising the drive structure according to any one of the above items.

5) According to a further aspect of the present disclosure, a drive method of a liquid crystal display panel is provided, wherein a drive structure of the liquid crystal display panel comprises a plurality of gate lines; a plurality of sets of charge and share gate lines, each set of charge and share gate lines corresponding to one of said plurality of gate lines and comprising a charge gate line and a share gate line; a plurality of switch units arranged at a gate driver input terminal; a plurality of switch units arranged at a gate driver output terminal, each corresponding to one of said the plurality of switch units arranged at the gate driver input terminal; a first drive signal line and a second drive signal line that are both arranged at the gate driver input terminal; and a third drive signal line, a fourth drive signal line, and a low-voltage signal line that are all arranged at the gate driver output terminal. The drive method comprises: under a 2D display mode, achieving activation of voltage charging and voltage sharing of each set of charge and share gate lines corresponding to a specific gate line, by a corresponding switch unit arranged at the gate driver input terminal based on voltage signals of the first drive signal line and the second drive signal line, and meanwhile by the corresponding switch unit arranged at the gate driver output terminal based on voltage signals of the third drive signal line, the fourth drive signal line, and the low-voltage signal line.

6) In one preferred embodiment according to item 1) of the present disclosure, a high voltage and a low voltage are respectively applied to the first drive signal line and the second drive signal line, and are switched therebetween with time, while the low voltage is constantly applied to the low-voltage signal line. During a same time period, when the first drive signal line is applied with the high voltage, the second, the third, and the fourth drive signal lines are applied with the low voltage, the low voltage, and the high voltage, respectively; and when the first drive signal line is applied with the low voltage, the second, the third, and the fourth drive signal lines are applied with the high voltage, the high voltage, and the low voltage, respectively.

7) According to still another aspect of the present disclosure, a drive method of a liquid crystal display panel is provided. A drive structure of the liquid crystal display panel comprises a plurality of gate lines; a plurality of sets of charge and share gate lines, each set of charge and share gate lines corresponding to one of said plurality of gate lines and comprising a charge gate line and a share gate line; a plurality of switch units arranged at a gate driver input terminal; a plurality of switch units arranged at a gate driver output terminal, each corresponding to one of said the plurality of switch units arranged at the gate driver input terminal; a first drive signal line and a second drive signal line that are both arranged at the gate driver input terminal; and a third drive signal line, a fourth drive signal line, and a low-voltage signal line that are all arranged at the gate driver output terminal. The drive method comprises: under a 3D display mode, achieving deactivation of voltage sharing and activation of voltage charging of each set of charge and share gate lines corresponding to a specific gate line, by a corresponding switch unit arranged at the gate driver input terminal based on voltage signals of the first drive signal line and the second drive signal line, and meanwhile by the corresponding switch unit arranged at the gate driver output terminal based on voltage signals of the third drive signal line, the fourth drive signal line, and the low-voltage signal line.

8) In one preferred embodiment according to item 7) of the present disclosure, the first drive signal line and the fourth drive signal line are both constantly applied with high voltages, while the second drive signal line, the third drive signal line, and the low-voltage signal line are each constantly applied with low voltages.

Compared with the prior art, one or more embodiments of the present disclosure has the following advantages.

With the drive structure of the present disclosure, separate control of the functions of voltage charging and voltage sharing can be achieved by means of the plurality of switch units arranged at the gate driver input and output terminals, in conjunction with corresponding timing signals. That is, the functions of voltage charging and voltage sharing can be both activated under the 2D display mode, while the function of voltage sharing can be deactivated and the function of voltage charging can be activated under the 3D display mode. Thus, the flicker phenomenon in a picture occurring during 3D display can be effectively eliminated. In addition, such a drive structure requires no addition of the gate ICs, and therefore will not add to production costs.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

In order to present the purpose, technical solution, and advantages of the present disclosure more explicitly, the present disclosure will be further explained in detail in connection with the accompanying drawings.

Figure 1:
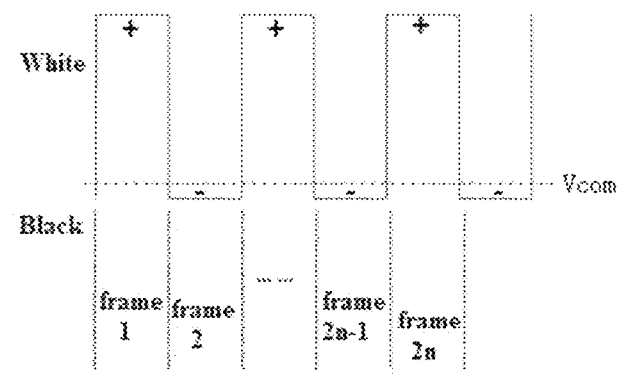
FIG. 1 schematically shows a frame inversion driving mode in the prior art.
Figure 2:
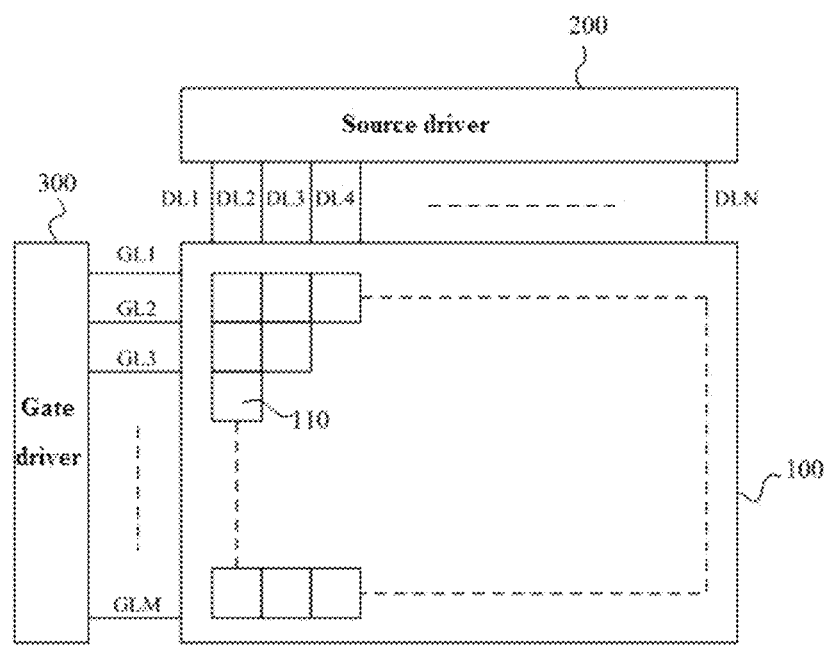
FIG. 2 schematically shows the structure of a liquid crystal display panel according to an embodiment of the present disclosure.

Reference can be made to FIG. 2, which schematically shows the structure of a liquid crystal display panel according to an embodiment of the present disclosure. As shown in FIG. 2, the display panel comprises an image display area 100, a source driver 200, and a gate driver 300. The image display area 100 comprises an array formed by a plurality of data lines (e.g., N data lines DL1-DLN as shown in the figure) staggered with a plurality of gate lines (e.g., M gate lines GL1-GLM as shown in the figure), and a plurality of pixel structures 110. The source driver 200, via the plurality of data lines coupled thereto, transmits supplied data signals to the image display area 100. And the gate driver 300, via the plurality of gate lines coupled thereto, transmits supplied scanning signals to the image display area 100.

Figure 3:
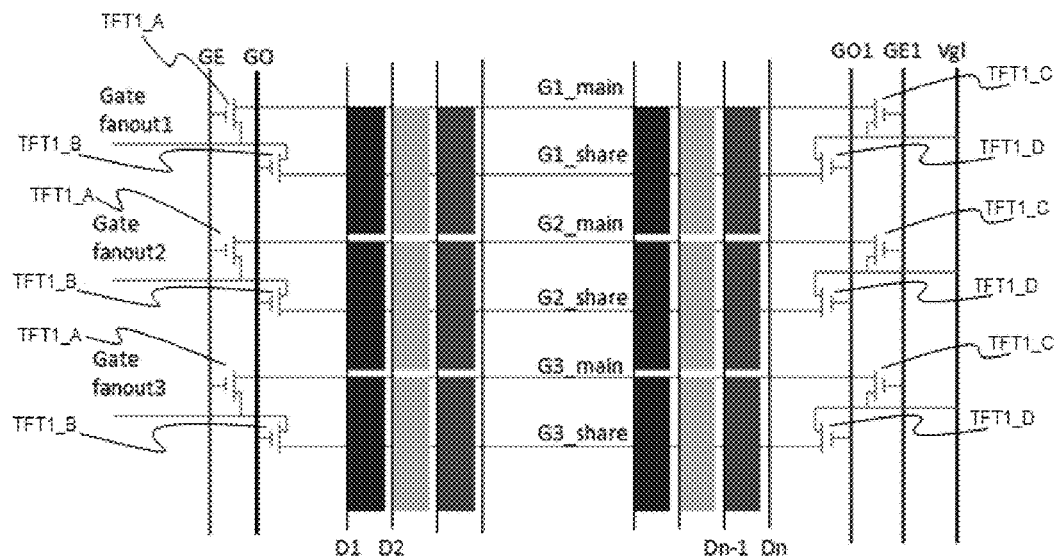
FIG. 3 schematically shows a drive structure of a liquid crystal display panel according to an embodiment of the present disclosure.

FIG. 3 schematically shows a drive structure of a liquid crystal display panel according to an embodiment of the present disclosure. As FIG. 3 shows, the liquid crystal display panel is provided with a plurality of sets of charge and share gate lines, each set of charge and share gate lines corresponding to one of a plurality of gate lines (e.g. G1). Each set of charge and share gate lines comprises one charge gate line (e.g. G1_main) and one share gate line (e.g. G1_share) corresponding to said charge gate line. A gate driver input terminal is provided with a plurality of switch units, and a gate driver output terminal is provided with a plurality of switch units corresponding to said plurality of switch units provided at the gate driver input terminal. Each switch unit comprises two switch elements (e.g., a switch unit consisting of a switch element TFT1_A and a switch element TFT1_B, and a switch unit consisting of a switch element TFT1_C and a switch element TFT1_D). The liquid crystal display panel further comprises a first drive signal line GE and a second drive signal line GO that are both provided at the input terminal, and a third drive signal line GE1, a fourth drive signal line GO1, and a low-voltage signal line Vg1 that are all provided at the output terminal.

In this case, activation of the functions of voltage charging and voltage sharing under a 2D display mode, and activation of the function of voltage charging and deactivation of the function of voltage sharing under a 3D display mode can be both achieved by each set of charge and share gate lines, under the control of a corresponding switch unit arranged at the input terminal based on signals applied to the signal lines GE and GO, and meanwhile under the control of a corresponding switch unit arranged at the output terminal based on signals applied to the signal lines GE1 and GO1, and to the low-voltage signal line Vg1.

Specifically, as FIG. 3 indicates, each switch unit at the input terminal comprises a first switch element (e.g., TFT1_A) for controlling a corresponding charge gate line, and a second switch element (e.g., TFT1_B) for controlling a corresponding share gate line, while each switch unit at the output terminal comprises a third switch element (e.g., TFT1_C) for controlling a corresponding charge gate line, and a fourth switch element (e.g., TFT1_D) for controlling a corresponding share gate line. Each of the switch elements comprises a gate, a first source/drain, and a second source/drain.

With respect to the gate line G1, the switch elements TFT1_A and TFT1_C both control the charge gate line G1_main, and the switch elements TFT1_B and TFT1_D both control the share gate line G1_share. Specifically, the switch element TFT1_A has its gate electrically connected to the first drive signal line GE, its first source/drain electrically connected to the charge gate line G1_main, and its second source/drain, together with the first source/drain of the switch element TFT1_B, electrically connected to the gate line G1 corresponding to the present set of charge and share gate lines. The switch element TFT1_B has its gate electrically connected to the second drive signal line GO, and its second source/drain electrically connected to the share gate line G1_share of the present set of charge and share gate lines. The switch element TFT1_C has its gate electrically connected to the third drive signal line GE1, its first source/drain electrically connected to the charge gate line G1_main of the present set of charge and share gate lines, and its second source/drain, together with the first source/drain of the switch element TFT1_D, electrically connected to the low-voltage signal line Vg1. The switch element TFT1_D has its gate electrically connected to the fourth drive signal line GO1, and its second source/drain electrically connected to the share gate line G1_share of the present set of charge and share gate lines.

In the present embodiment, under the 2D display mode, a high voltage and a low voltage are respectively applied to the signal lines GE and GO, and are switched therebetween with time. That is, during a time period of T1, the signal line GE is applied with the high voltage, and the signal line GO is applied with the low voltage; while during a time period of T2, the signal line GE is applied with the low voltage, and the signal line GO is applied with the high voltage.

It should be noted that under the 2D display mode, the signal lines GE and GE1 are applied with voltages of opposite properties, and the signal lines GO and GO1 are also applied with voltages of opposite properties. The low-voltage signal line Vg1 is constantly applied with the low voltage.

Under the 3D display mode, the signal line GE is constantly applied with the high voltage, and the signal line GO is constantly applied with the low voltage. In addition, when the signal line GE is applied with the high voltage, the signal line GE1 is constantly applied with the low voltage, while when the signal line GO is applied with the low voltage, the signal line GO1 is constantly applied with the high voltage. The low-voltage signal line Vg1 is constantly applied with the low voltage.

Such being the case, the voltage charging and sharing functions can be achieved under the 2D display mode through the plurality of switch units arranged at the gate driver input terminal and the gate driver output terminal, in conjunction with the signals applied under control as aforementioned. Under the 3D display mode, the voltage sharing function is deactivated, and only the voltage charging function is activated.

In order to further understand the features and advantages of the present disclosure, FIG. 3 and the timing diagram of Table 1 will be referred to in the following to illustrate how the voltage sharing and charging functions under the 2D display mode can be achieved.

TABLE 1

| Time | GE | GO | GE1 | GO1 | Vgl | G1 | G2 | G3 | G1_main | G1_share | G2_main | G2_share | G3_main | G3_share |
|---|---|---|---|---|---|---|---|---|---|---|---|---|---|---|
| T1 | H | L | L | H | L | H | L | L | H | L | L | L | L | L |
| T2 | L | H | H | L | L | H | L | L | L | H | L | L | L | L |
| T3 | H | L | L | H | L | L | H | L | L | L | H | L | L | L |
| T4 | L | H | H | L | L | L | H | L | L | L | L | H | L | L |
| T5 | H | L | L | H | L | L | L | H | L | L | L | L | H | L |
| T6 | L | H | H | L | L | L | L | H | L | L | L | L | L | H |

Specifically, in the timing as shown above in Table 1, during the time period of T1, the signal line GE, the gate line G1, and the signal line GO1 are each applied with high voltages H, and the signal line GO, gate lines G2-Gn, and the signal line GE1 are each applied with low voltages L, while low-voltage signal line Vg1 is constantly applied with the low voltage L.

During the time period of T1, because the signal line GE is applied with the high voltage H, the switch element TFT1_1 is activated, so that the signal of the gate line G1 can be transmitted to the charge gate line G1_main, so as to activate a switch element TFT which is arranged within the structure of the pixel structure and corresponds to the charge gate line G1_main. Moreover, during this time period, the signal line GE1 is applied with the low voltage L, and the switch element TFT1_C is deactivated, so that the signal of the low-voltage signal line Vg1 will not be transmitted to the charge gate line G1_main. Meanwhile, the signal line GO is applied with the low voltage L, and the switch element TFT1_B is deactivated, so that the high voltage of the gate line G1 cannot be transmitted to the share gate line G1_share; while the signal line GO1 is applied with the high voltage, and the switch element TFT1_D is activated, so that the low-voltage signal of the low-voltage signal line Vg1 can be transmitted to the share gate line G1_share.

During this moment, since the gate line G2 is applied with the low voltage L, and the signal line GE is applied with the high voltage H, so that the low voltage of the gate line G2 can be transmitted to a charge gate line G2_main. In addition, the signal line GO1 is applied with the high voltage H, so that the low voltage of the low-voltage signal line Vg1 can be transmitted to a share gate line G2_share.

The share gate lines and charge gate lines corresponding to the gate lines G3-Gn can be activated in a similar way as described above, which will not be repeated herein.

During a time period of T2, the signal line GE, the gate line G2, the gate lines G3-Gn, and the signal line GO1 are each applied with the low voltages L, and the signal line GO, the gate line G1, and the signal line GE1 are each applied with the high voltages H, while low-voltage signal line Vg1 is constantly applied with the low voltage L.

Because the signal line GO is applied with the high voltage, and the switch element TFT1_B is activated, so that the signal of the gate line G1 can be transmitted to the share gate line G1_share, so as to activate a switch element TFT which is arranged within the structure of the pixel structure and corresponds to the share gate line G1_share. During this time period, the signal line GO1 is applied with the low voltage L, and the switch element TFT1_D is deactivated, so that the signal of the low-voltage signal line Vg1 will not be transmitted to the share gate line G1_share. Meanwhile, signal line GE is applied with the low voltage, and the switch element TFT1_A is deactivated, so that the high voltage H of the gate line G1 cannot be transmitted to the charge gate line G1_main; while the signal line GE1 is applied with the high voltage, and the switch element TFT1_C is activated, so that the low voltage L of the low-voltage signal line Vg1 can be transmitted to the charge gate line G1_main.

Meanwhile, the gate line G2 is applied with the low voltage L, and the signal line GO is applied with the high voltage H, so that the low voltage L of the gate line G2 can be transmitted to the share gate line G2_share. In addition, the gate line GE1 is applied with the high voltage, so that the low voltage L of the low-voltage signal line Vg1 can be transmitted to the charge gate line G2_main.

The share gate lines and charge gate lines corresponding to the gate lines G3-Gn can be activated in a similar way as described above, which will not be repeated herein.

FIG. 3 and the timing diagram of Table 2 will be referred to in the following to illustrate how to achieve deactivation of the voltage sharing function and activation of the voltage charging function under the 3D display mode.

TABLE 2

| Time | GE | GO | GE1 | GO1 | Vgl | G1 | G2 | G3 | G1_main | G1_share | G2_main | G2_share | G3_main | G3_share |
|------|----|----|-----|-----|-----|----|----|----|---------|----------|---------|----------|---------|----------|
| T1 | H | L | L | H | L | H | L | L | H | L | L | L | L | L |
| T2 | H | L | L | H | L | H | L | L | H | L | L | L | L | L |
| T3 | H | L | L | H | L | L | H | L | L | L | H | L | L | L |
| T4 | H | L | L | H | L | L | H | L | L | L | H | L | L | L |
| T5 | H | L | L | H | L | L | L | H | L | L | L | L | H | L |
| T6 | H | L | L | H | L | L | L | H | L | L | L | L | H | L |

In the timing as shown above in Table 2, under the 3D display mode, the signal line GE is constantly applied with the high voltage, and the signal line GO is constantly applied with the low voltage. In addition, when the signal line GE is applied with the high voltage, the signal line GE1 is applied with the low voltage, and when the signal line GO is applied with the low voltage, the signal line GO1 is applied with the high voltage, while the low-voltage signal line Vg1 is constantly applied with the low voltage.

Specifically, during the time period of T1, the signal line GE, the gate line G1, and the signal line GO1 are each applied with the high voltages, and the signal line GO, the gate lines G2-Gn, and the signal line GE1 are each applied with the low voltages, while the low-voltage signal line Vg1 is constantly applied with the low voltage.

Because the signal line GE is applied with the high voltage, the switch element TFT1_1 is activated, so that the signal of the gate line G1 can be transmitted to the charge gate line G1_main, so as to activate the TFT element corresponding to the charge gate line G1_main. During this time period, the signal line GE1 is applied with the low voltage, and the switch element TFT1_C is deactivated, so that the signal of the low-voltage signal line Vg1 will not be transmitted to the charge gate line G1_main. Meanwhile, the signal line GO is applied with the low voltage, and the switch element TFT1_B is deactivated, so that the high voltage of the gate line G1 cannot be transmitted to the share gate line G1_share; while the signal line GO1 is applied with the high voltage, and the switch element TFT1_D is activated, so that the low-voltage signal of the low-voltage signal line Vg1 will be transmitted to the share gate line G1_share.

Meanwhile, the gate line G2 is applied with the low voltage, and the signal line GE is applied with the high voltage, so that the low voltage of the gate line G2 can be transmitted to the charge gate line G2_main. In addition, the gate line GO1 is applied with the high voltage, so that the low voltage of the low-voltage signal line Vg1 can be transmitted to the share gate line G2_share.

The share gate lines and charge gate lines corresponding to the gate lines G3-Gn can be activated in a similar way as described above, which will not be repeated herein.

During the time period of T2, voltages are applied in the same way as they are during the time period of T1.

During a time period of T3, the signal line GE, the gate line G2, and the signal line GO1 are each applied with the high voltages, and the signal line GO, the gate line G1, the gate lines G3-Gn, and the signal line GE1 are each applied with the low voltages, while the low-voltage signal line Vg1 is constantly applied with the low voltage.

Because the signal line GE is applied with the high voltage, the switch element TFT1_A is activated, so that the low voltage of the gate line G1 can be transmitted to the charge gate line G1_main. During this time period, the signal line GE1 is applied with the low voltage, and the switch element TFT1_C is deactivated, so that the signal of the low-voltage signal line Vg1 will not be transmitted to the charge gate line G1_main. Meanwhile, the signal line GO is applied with the low voltage, and the switch element TFT1_B is deactivated, so that the low voltage of the gate line G1 cannot be transmitted to the share gate line G1_share; while the signal line GO1 is applied with the high voltage, and the switch element TFT1_D is activated, so that the low-voltage signal of the low-voltage signal line Vg1 will be transmitted to the share gate line G1_share.

Meanwhile, the gate line G2 is applied with the high voltage, and since the signal line GE is applied with the high voltage, and the switch element TFT1_A is activated, the high voltage of the gate line G2 can be transmitted to the charge gate line G2_main. As a result, the switch element TFT corresponding to the charge gate line G2_main can be activated. During this time period, the signal line GE1 is applied with the low voltage, and the switch element TFT1_C is deactivated, so that the signal of the low-voltage signal line Vg1 will not be transmitted to the charge gate line G2_main. Meanwhile, the signal line GO is applied with the low voltage, and the switch element TFT1_B is deactivated, so that the high-voltage signal of the gate line G2 cannot be transmitted to the share gate line G2_share; while the signal line GO1 is applied with the high voltage, thereby transmitting the low-voltage signal of the low-voltage signal line Vg1 to the share gate line G2_share.

The share gate lines and charge gate lines corresponding to the gate lines G3-Gn can be activated in a similar way as described above, which will not be repeated herein.

As can be seen from the above, the voltage sharing function is constantly deactivated under the 3D display mode.

Based on the foregoing, through the drive structure of the LCD panel according to the present disclosure, activation of the share gate lines and charge gate lines under the 2D display mode, and deactivation of the share gate lines under the 3D display mode can be both achieved, based on only the plurality of switch units arranged at the gate driver input and output terminals, in conjunction with pre-set timing signals. Hence, the voltage charging and voltage sharing functions are separately controllable, thereby effectively eliminating the flicker phenomenon in the display of a 3D picture. In addition, such a drive structure requires no addition of the gate ICs, and therefore will not add to production costs.

The above description should not be construed as limitations of the present disclosure, but merely as exemplifications of preferred embodiments thereof. Any variations or replacements that can be readily envisioned by those skilled in the art are intended to be within the scope of the present disclosure. Hence, the scope of the present disclosure should be subject to the scope defined in the claims.

The invention claimed is:

1. A drive method of a liquid crystal display panel, wherein a drive structure of the liquid crystal display panel comprises a plurality of gate lines; a plurality of sets of charge and share gate lines, each set of charge and share gate lines corresponding to one of said plurality of gate lines and comprising a charge gate line and a share gate line; a plurality of switch units arranged at a gate driver input terminal; a plurality of switch units arranged at a gate driver output terminal, each corresponding to one of said the plurality of switch units arranged at the gate driver input terminal; a first drive signal line and a second drive signal line that are both arranged at the gate driver input terminal; and a third drive signal line, a fourth drive signal line, and a low-voltage signal line that are all arranged at the gate driver output terminal, and wherein the drive method comprises:
under a 3D display mode, achieving deactivation of voltage sharing and activation of voltage charging of each set of charge and share gate lines corresponding to a specific gate line, by a corresponding switch unit arranged at the gate driver input terminal based on voltage signals of the first drive signal line and the second drive signal line, and meanwhile by the corresponding switch unit arranged at the gate driver output terminal based on voltage signals of the third drive signal line, the fourth drive signal line, and the low-voltage signal line, wherein the first drive signal line and the fourth drive signal line are both constantly applied with high voltages over a whole frame period, while the second drive signal line, the third drive signal line, and the low-voltage signal line are each constantly applied with low voltages over the whole frame period.

* * * * *